United States Patent
Linn-Moran et al.

(10) Patent No.: US 11,683,369 B2
(45) Date of Patent: Jun. 20, 2023

(54) SYSTEM FOR CENTRALIZED DATA COLLECTION IN A DISTRIBUTED SERVICE-ORIENTED SYSTEM

(71) Applicant: NXP USA, Inc., Austin, TX (US)

(72) Inventors: Robert Freddie Linn-Moran, Largs (GB); Alan Devine, Paisley (GB); Michael Johnston, Paisley (GB)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/690,734

(22) Filed: Nov. 21, 2019

(65) Prior Publication Data

US 2021/0160315 A1    May 27, 2021

(51) Int. Cl.
| | |
|---|---|
| H04L 67/1095 | (2022.01) |
| G07C 5/00 | (2006.01) |
| H04L 12/40 | (2006.01) |
| H04L 67/562 | (2022.01) |

(52) U.S. Cl.
CPC ......... *H04L 67/1095* (2013.01); *G07C 5/008* (2013.01); *H04L 12/40* (2013.01); *H04L 67/562* (2022.05); *H04L 2012/40273* (2013.01)

(58) Field of Classification Search
CPC ......... H04L 69/22; H04L 69/16; H04L 45/74; H04L 67/12; G06F 9/4416; G06F 9/45533
See application file for complete search history.

(56) References Cited

U.S. PATENT DOCUMENTS

| | | | |
|---|---|---|---|
| 7,979,379 | B2 | 7/2011 | Voegele et al. |
| 8,819,213 | B2 | 8/2014 | Frattura et al. |
| 2016/0241659 | A1* | 8/2016 | Wessendorf ............ H04L 67/26 |
| 2016/0342531 | A1 | 11/2016 | Sharma |
| 2018/0232959 | A1 | 8/2018 | Thornburg et al. |
| 2018/0262466 | A1 | 9/2018 | Atad et al. |

(Continued)

FOREIGN PATENT DOCUMENTS

| | | |
|---|---|---|
| EP | 3171545 A1 | 5/2017 |
| WO | WO 2013171234 A1 | 11/2013 |

OTHER PUBLICATIONS

Becker et al: "Towards QoS-Aware Service-Oriented Communication in E/E Automotive Architectures", I ECON 2018—44th Annual Conference of the IEEE Industrial Electronics Society, IEEE, Oct. 21, 2018 (Oct. 21, 2018), pp. 4096-4101.

(Continued)

*Primary Examiner* — Iqbal Zaidi (57) ABSTRACT

A system, method, apparatus and electronic control unit are provided for centralized data collection at a single controller device (110) in a distributed service-oriented system (100) by applying one or more classifiers (102-104, 114) to a message traffic packet (1) received at the Ethernet switch (101) of the single controller device to selectively identify service update information from service-oriented traffic messages in the message traffic packet without generating additional message traffic packets on the network system bus, and by mirroring each message traffic packet (3) containing service update information to a processing element (111) in the single controller to identify and extract specified data from the identified service update information for storage in a centralized database which is updated as services publish new information on the network system bus.

18 Claims, 5 Drawing Sheets

(56) References Cited

U.S. PATENT DOCUMENTS

2020/0156579 A1* 5/2020 Negishi ................ B60R 21/01
2021/0014340 A1* 1/2021 Weber ................... H04L 69/22

OTHER PUBLICATIONS

Cakir et al: "A QoS Aware Approach to Service-Oriented Communication in Future Automotive Networks", arxiv.org, Cornell University Library, 201 Olin Library Cornell University Ithaca, NY 14853, Nov. 5, 2019 (Nov. 5, 2019), sections I, II, IV, 8 pages.
Gururaja, SOME-IP, Scalable service-Oriented MiddlewarE over IP, downloaded Jul. 9, 2019.

* cited by examiner

SYSTEM FOR CENTRALIZED DATA COLLECTION IN A DISTRIBUTED SERVICE-ORIENTED SYSTEM

BACKGROUND OF THE INVENTION

Field of the Invention

The present invention is directed in general to field of networked microcontroller systems and methods of operating same. In one aspect, the present invention relates to distributed service-oriented communications, systems, methods, apparatus, and software architecture for automotive vehicle networks.

Description of the Related Art

With computer system networks, the ability to monitor, control and track service information for all networked system components is complicated by the number and complexity of interactions of networked system components, as well as the overhead and complexity of additional hardware and software that is required to provide such control functionality. With trends in the automotive industry toward providing vehicle autonomy, electrification, and connectivity, automotive vehicles often include numerous integrated circuit computer systems, such as electronic control units (ECUs), microcontrollers (MCUs), System(s)-on-a-Chip (SoC), and System(s)-in-a-Package (SiP), connected together in a suitable vehicle network using one or more ethernet switches. However, there are technical challenges and complexities with establishing communications between the individual computer systems in such automotive vehicle networks. One increasingly popular solution for automotive vehicle networks is to use distributed service-oriented communications systems, such as a Scalable service Oriented MiddlewarE over IP (SOME/IP) communications protocol. Using the SOME/IP protocol, distributed service-oriented communications work on the principle of each "service" publishing its own information and/or subscribing to other "services" information. In contrast, a centralized service-oriented comms system, whereby a single central entity is the gateway for all communications (i.e., all services publish/subscribe to this) & therefore has visibility of all services information.

One of the challenges of a distributed service-oriented communications network is that no single entity typically has full visibility of all service information within the system. In an automotive vehicle network, it would be desirable to have this functionality for vehicle manufacturers to monitor and access the service information flowing within the network—whether that be for security monitoring, analytics monitoring or a centralized database of vehicle service information accessible to off-vehicle access (e.g., cloud apps). In a distributed system, it is possible to create a dedicated service with the function of subscribing to all service information in the network, but such a dedicated service is intrusive to the network as an extra cost and additional service that would generate new traffic on the network (lowering utilization) solely for the purpose of this monitoring/access. As seen from the foregoing, the existing computer system network and operations solutions are extremely difficult at a practical level by virtue of the challenges of providing a service observation and monitoring capability that can gather service information from all networked computer systems without imposing additional costs, excessive overhead, and complexity of additional hardware and software.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A high-performance, non-intrusive, cost-effective centralized data collection system, apparatus, architecture, and methodology are described for providing full visibility of all service information within a distributed service-oriented system without generating new traffic over the system's communication network. In selected embodiments, the centralized data collection system uses one or more classifiers at an electronic control unit to identify specified "publish information" events from service-oriented traffic messages in the network traffic so that specified message data may be extracted for storage in a centralized database. To this end, the electronic control unit may be connected and configured to inspect or "snoop" received network traffic messages non-intrusively in real-time, such as by applying a first classifier rule (e.g., at one or more Ethernet switches) to detect or classify specified service-oriented traffic messages. In addition, the electronic control unit may be connected and configured to internally mirror or transfer service-oriented traffic messages (e.g., to a processing entity) for additional processing, such as by applying a second classifier rule to detect or classify specified "publish information" events (e.g., notifications of information changing). Once "publish information" events are identified, the electronic control unit may be connected and configured to extract predetermined data (e.g., message ID, length, and payload) for storage, thereby building a central database of service information which is being updated as services are publishing new information on the network.

Figure 1:
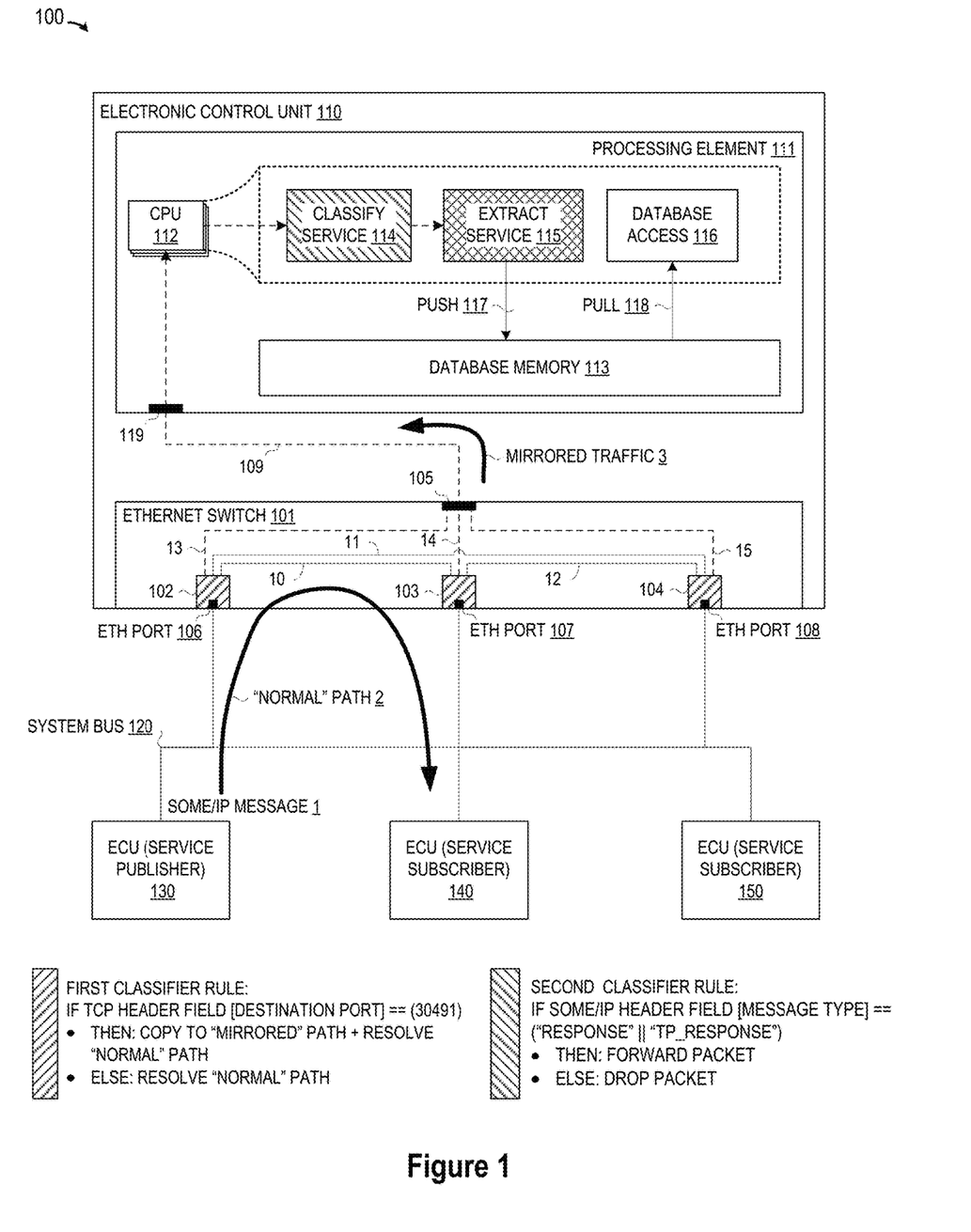
FIG. 1 is a block diagram illustration of a networked computer system with an electronic control unit having a processing element and Ethernet switch to provide a centralized data collection system for tracking service-oriented traffic from other networked electronic control units connected in a distributed service-oriented system in accordance with selected embodiments of the present disclosure.

To provide additional details for an improved understanding of selected embodiments of the present disclosure, reference is now made to FIG. 1 which is a simplified block diagram illustration of a networked computer system 100 of multiple electronic control units (ECUs) 110, 130, 140, 150 connected over a system bus 120. As disclosed, each ECU 110, 130, 140, 150 may be an integrated circuit device, such as a microcontroller (MCU) or system-on-chip SoC), which executes any programming code and/or instructions to provide a specified program functionality. In selected automotive vehicle network embodiments of the present disclosure, the ECUs 110, 130, 140, 150 are connected together over a wired Ethernet network system bus 120 in a star topology. In such embodiments, a single control ECU 110 in the networked computer system 100 can implement the centralized data collection system by including one or more Ethernet switches 101 and a processing element 111 which use a SOME/IP protocol feature to non-intrusively monitor all traffic in the topology which passes through the Ethernet switch(es) 101.

To this end, the control ECU 110 may be configured to apply a first classifier rule 102-104 at the Ethernet ports 106-108 of the switch 101 to identify any received network traffic message which is service-oriented traffic. In FIG. 1, the application of the first classification rule at the Ethernet ports 106-108 is indicated with the first cross-hatched shading. In an example implementation using the SOME/IP protocol in an Ethernet star topology, the first classifier rule applied at the switch 101 may evaluate the TCP header field from a received SOME/IP network traffic message 1 to determine if the message is directed to a specified destination port (e.g., [Destination Port]==(30491)). Such a classifier rule may exploit an existing feature of the SOME/IP protocol specification which states that, unless otherwise specified, TCP port 30491 may be used as the SOME/IP dynamic client port at the Ethernet switch.

If directed to the specified destination port, the SOME/IP network traffic message 1 received at the Ethernet port 106 is sent over the "normal" path 2 (e.g., via switch signal path 10 and Ethernet port 107) to the intended destination ECU (e.g., 140), but is also sent as mirrored traffic 3 over an internal "mirrored" path (e.g., via switch signal path 13, data connection port 105, internal bus conductor 109, and data connection port 119) to the processing element 111 for additional processing. However, if the received SOME/IP network traffic message 1 is not directed to the specified destination port, there is no service-oriented traffic detected in the received SOME/IP network traffic message 1, so it is only sent over the "normal" path 2 to the intended destination ECU (e.g., 140) without being mirrored to the processing element 111.

As will be appreciated, the switch 101 also applies the first classifier rule 103, 104 to SOME/IP network traffic messages received on other Ethernet ports 107, 108 for "normal" path routing directly to the destination ECU if the TCP header field is not directed to the specified destination port. For example, a "normal" path for network traffic received at Ethernet port 108 from ECU 150 and directed to ECU 130 would include Ethernet port 108, switch signal path 11 and Ethernet port 106. By the same token, the application of the first classifier rule 103, 104 at switch 101 to SOME/IP network traffic messages received on other Ethernet ports 107, 108 will route the received SOME/IP network traffic messages over the "mirror" path routing to the processing element 111 if the TCP header field is directed to the specified destination port. For example, a "mirror" traffic path 3 for network traffic received at Ethernet port 108 from ECU 150 and directed to ECU 130 would include Ethernet port 108, switch signal path 15, connection port 105, internal bus conductor 109, and data connection port 119.

Once the service-oriented traffic is identified by the switch 101 and transferred internally along the mirrored traffic path 3, the processing element 111 may identify specified "publish information" events from service-oriented traffic messages and extract specified message data for storage in a centralized database 113. To this end, the processing element 111 may include one or more CPUs 112 and an internal or database memory 113, alone or in combination with other component (not shown) connected via one or more internal communication bus lines to execute or process an operating system or a real-time operating system (RTOS) software which includes several modules. In particular, the processing element 111 may be configured to execute a classify service 114 at a CPU 112 which applies a second classifier rule to identify "publish information" events (i.e., notifications of changes to service information) and to extract specified data from the publish information events for storage in a database memory 113. In FIG. 1, the application of the second classification rule at the processing element 111 is indicated with the second cross-hatched shading at the classify service module 114. In an example implementation using the SOME/IP protocol in an Ethernet star topology, the second classifier rule applied at the processing element 111 may evaluate a SOME/IP header field from a received SOME/IP network traffic message 1 to determine if the message is directed to a specified message type (e.g., [Message Type]==("RESPONSE"||"TP_RESPONSE")). If the message classification service 114 detects a specified message type notification that service information is changing, then the processing element 111 forwards the corresponding packet(s) to the extraction service 115 for additional extraction processing. Continuing with the example SOME/IP protocol implementation, the extraction service 115 may extract specified data from predetermined SOME/IP fields (such as service information or Message ID, Length, and Payload) and to push this data 117 to the database memory 113 for storage. In this way, the ECU 110 builds a central database 113 of service information which is being updated as services are publishing new information on the network 100. Using the database access module 116 to access information in the database 113, the processing element 111 may pull information 118 to gaining visibility to all service-oriented traffic within the network (i.e., passing through the switch). On the other hand, if a specified message type notification is not detected by the message classification service 114, then the corresponding packet is dropped. As will be appreciated, the processing element 111 applies the second classifier rule to all mirrored service-oriented traffic 3 from the switch(es) 101.

Generally speaking, the control ECU 110 may be may be operatively configured to classify any service-oriented Ethernet traffic (based on appropriate header fields) received across all ports 106-108 at the switch 101 and mirror to a specific Ethernet port (e.g., 119) connected to a processing element 111 for additional processing to detect newly published service information. By routing the mirrored traffic 3 internally within the ECU 110 for additional detection processing, the processing element 111 gains visibility of all service-oriented traffic which passes through the switch 101 without generating new traffic on the network system bus 120.

Figure 2:
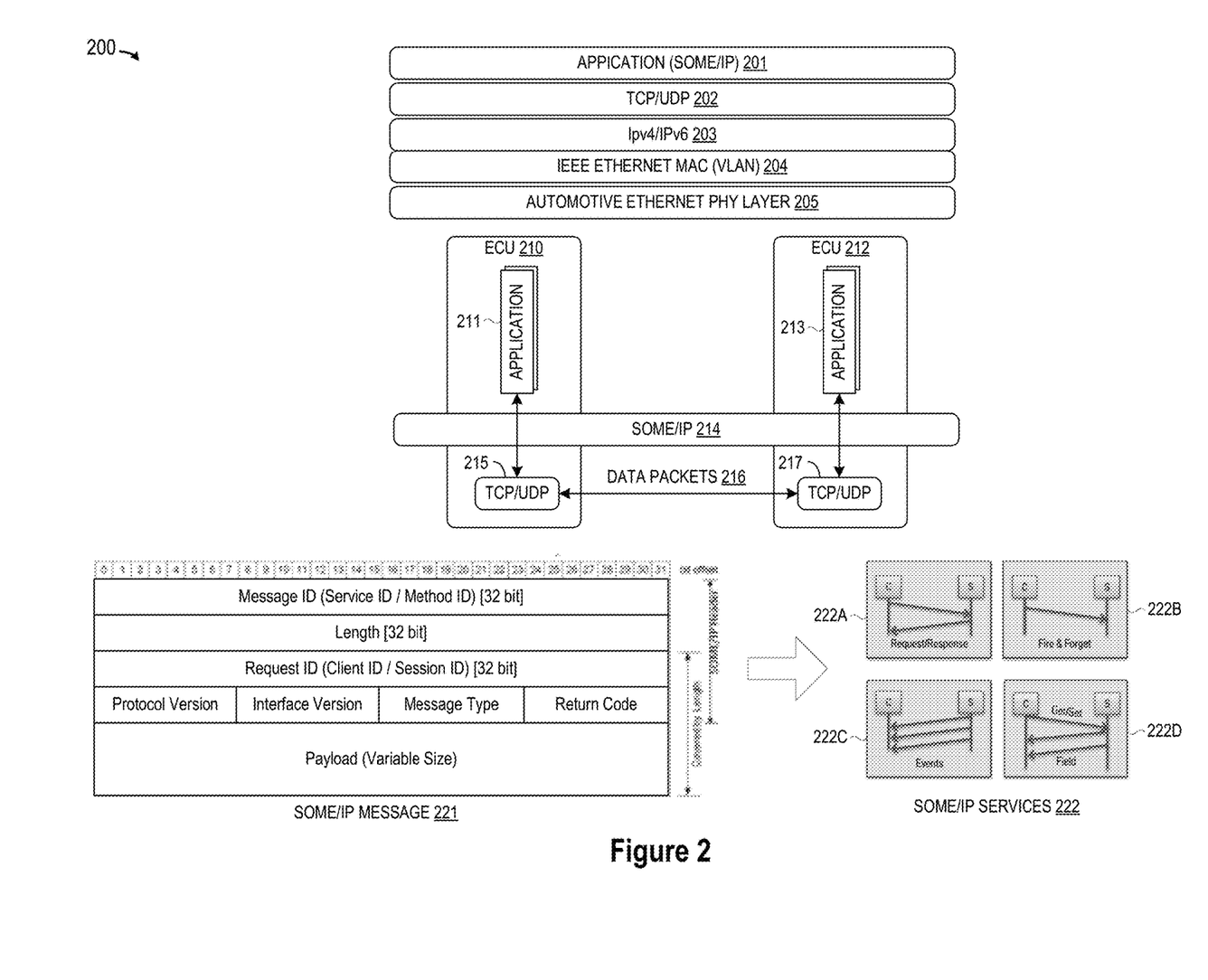
FIG. 2 is a block diagram illustration of how applications running on different electronic control units can communicate SOME/IP service information using a communication protocol stack.

To provide additional details for an improved understanding of selected embodiments of the present disclosure, reference is now made to FIG. 2 which is a block diagram illustration 200 of how separate applications 211, 213 running on different electronic control units 210, 212 can use a distributed service-oriented communications protocol to communicate service information using a communication protocol stack 201-206. In selected automotive vehicle network embodiments of the present disclosure, the communication protocol may be implemented with the Scalable service Oriented MiddlewarE over IP (SOME/IP) automotive middleware solution which provides service-oriented communications over a network between the applications 211, 213, though any suitable distributed service oriented communications protocol may be used, including but not limited to a data distribution service (DDS) or the like. In the SOME/IP protocol embodiments, a wide range of middleware features are supported, including Serialization (for transforming into and from on-wire representation), Remote Procedure Call (RPC) (for implementing remote invocation of functions), Service Discovery (SD) (for dynamically finding and functionality and configuring its access), Publish/Subscribe (Pub/Sub) (for dynamically configuring which data is needed and shall be sent to the client), and Segmentation of UDP messages (for allowing the transport of large SOME/IP messages over UDP without the need of fragmentation). In operation, these features are implemented within the OSI stack 201-205 using any suitable operating system (e.g., AUTOSAR, GENIVI Linux, OSEK, etc.) or with embedded devices that do not require an operating system. However implemented, the SOME/IP protocol allows applications 211, 213 on separate ECUs 210, 212 to communicate by automatically determining the message packet formats based on the specified service. In the example of FIG. 2, the Service Discovery feature is implemented in the OSI application layer(s) 201 where the applications 211, 213 communicate over the SOME/IP middleware 214 to the TCP/UDP layer 202 which constructs the data packets 216 to be exchanged over the lower level OSI layers (e.g., the IEEE Ethernet MAC (VLAN) layer 204 and automotive Ethernet physical layer 205).

To support a variety of different services, the TCP/UDP layers 215, 217 at each ECU 210, 212 may be configured to generate and decode a SOME/IP message 221 which includes header and payload portions. To set up the variable length payload portion for transmission, the header portion includes a Message ID field for conveying a Service ID (for uniquely identifying each service) or a Method ID (for identifying a method or event). In addition, the header includes a Length field (to identify the payload length in bytes), a Request ID field for conveying a client ID (for identifying the calling client inside the ECU) or a session ID (for session handling identification), a Protocol Version field, an Interface Version field, a Message Type field, and a Return Code field. Based on values store in the Message Type field, different types of SOME/IP traffic may be controlled. For example, a first value in the Message Type field specifies a "Request/Response" service request 222A where a Request message is sent from a client to a server calling a method, and where a Response message is returned from the server to the client which transports the results of the method invocation. In addition, a second value in the Message Type field specifies a "Fire & Forget" service request 222B where a Request message is sent from a client to a server calling a method but without requiring a response message. In addition, a third value in the Message Type field specifies an "Events" service request 222C as a Fire & Forget callback where there is no Request message sent from a client to a server, but instead the server sends one or more Event messages to the client on a predetermined basis (e.g., cyclically or on a detected change). Finally, a fourth value in the Message Type field specifies an "Fields" service request 222D where a Get/Set message is sent from a client to a server to read or set a remotely accessible field value, and where a Response and/or Event(s) message is returned from the server to the client which transports the results of the Get/Set invocation.

Since the Message Type field defines how SOME/IP traffic is sent over the network, the centralized data collection system disclosed herein may exploit this information by classifying on the appropriate "Message Types" to isolate the traffic that is only updating service information (i.e., publishing information updates). In selected embodiments, the classification processing may be configured to detect "Request/Response" service requests, alone or in combination with "Events" service requests, when these messages indicate that service information is being updated. In the control ECU 110 shown in FIG. 1, the classification processing to detect service information updates is distributed across the switch 101 and processing element 111. However, it will be appreciated that other distributions of the classification processing functionality can be used. For example, the classify service 114 on the processing element 111 could be moved to the Ethernet switch 101 and still detect newly published service information without generating new traffic on the network system bus 120. In addition or in the alternative, the classify service 114 could be defined to classification on specific service IDs to further reduce traffic that is captured. One advantage of having more selective, service ID-based classification is when the database memory 113 has limited storage capacity.

In addition to adaptively configuring the classify service 114, it will be appreciated that the extraction service 115 may also be configurably modified to include additional steps. For example, the data extraction service may include data processing steps to test the validity of information extracted from the SOME/IP message, to apply a timestamp to the extracted information, or the like. In addition, the extraction service 115 may be configured to only update the database memory 113 upon change of the payload data in the SOME/IP message.

As disclosed herein, the use of a single control ECU to non-intrusively gain visibility of all service-oriented traffic within the network can be applied using a switch configurations at the control ECU. For example, reference is now made to FIG. 3 which is a simplified block diagram illustration of a networked computer system 300 wherein a single control ECU 310 includes a processing element 311 and multiple switches 301A, 301B connected over separate network system busses 320, 330 to separate groups of ECUs 321-323, 331-333 that define separate networks within the automotive vehicle. In this arrangement, the single control ECU 310 may be connected to implement the centralized data collection system by using the first Ethernet switch 301A to apply a first classifier rule at each Ethernet port 302A-304A so that any received SOME/IP messages from ECUs 321-323 are identified as service-oriented traffic if the TCP header field from a received SOME/IP network traffic message is directed to a specified destination port (e.g., [Destination Port]=(30491)). In similar fashion, the single control ECU 310 may be connected to use the second Ethernet switch 301B to apply the first classifier rule at each Ethernet port 302B-304B so that any received SOME/IP messages from ECUs 331-333 are identified as service-oriented traffic if the TCP header field from a received SOME/IP network traffic message is directed to a specified destination port (e.g., [Destination Port]==(30491)).

Figure 3:
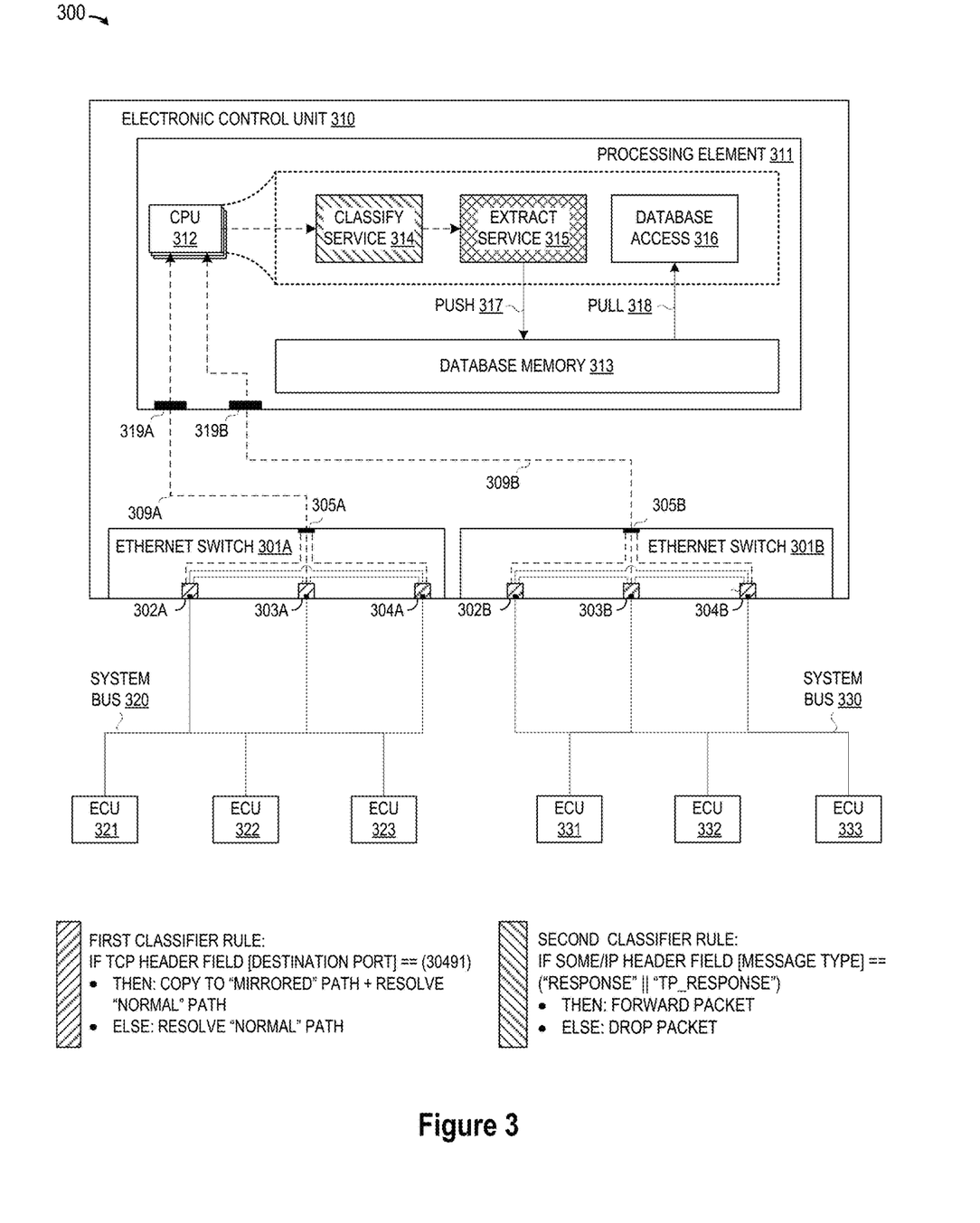
FIG. 3 is a block diagram illustration of an electronic control unit having a processing element and multiple Ethernet switches to provide a centralized data collection system for tracking service-oriented traffic from other networked electronic control units connected in a distributed service-oriented system in accordance with selected embodiments of the present disclosure.

At each of the switches 301A, 301B, the application of the first classification rule at the Ethernet ports 302A-304A, 302B-304B is indicated with the first cross-hatched shading. If the received SOME/IP network traffic message is not directed to the specified destination port, there is no service-oriented traffic, so the received SOME/IP network traffic message is only sent over the "normal" path to the intended destination ECU without being mirrored to the processing element 311. However, if the application of the first classification rule determines that a received SOME/IP message is directed to the specified destination port, this indicates there is service-oriented traffic detected, so the SOME/IP network traffic message is sent over the "normal" path (e.g., via the switch signal path and applicable Ethernet port) to the intended destination ECU, and is also sent as mirrored traffic over an internal "mirrored" path (e.g., via switch signal path, data connection port 305, internal bus conductor 309, and data connection port 319) to the processing element 311 for additional processing, much in the same way as depicted in FIG. 1.

At the processing element 311, any mirrored service-oriented traffic message received over the data connection ports 319A, 319B is evaluated to identify specified "publish information" events and to extract specified message data for storage in a centralized database 313. To this end, the processing element 311 includes one or more CPUs 312 and an internal or database memory 313 which are connected and configured to execute a classify service 314 which applies a second classifier rule to identify "publish information" events (i.e., notifications of changes to service information) and to extract specified data from the publish information events for storage in a database memory 313, much in the same way as depicted in FIG. 1. In FIG. 3, the application of the second classification rule at the processing element 311 is indicated with the second cross-hatched shading at the classify service module 314. In an example implementation using the SOME/IP protocol, the second classifier rule applied at the processing element 311 may evaluate a SOME/IP header field from a received SOME/IP network traffic message to determine if the message is directed to a specified message type (e.g., [Message Type] ==("RESPONSE"||"TP_RESPONSE")). If the message classification service 314 detects a specified message type notification that service information is changing, then the processing element 311 forwards the corresponding packet (s) to the extraction service 315 for additional processing to extract specified data from predetermined SOME/IP fields (such as service information or Message ID, Length, and Payload) and to push this data 317 to the database memory 313 for storage. In this way, the ECU 310 builds a central database 313 of service information which is being updated as services are publishing new information on the network 300. Using the database access module 316 to access information in the database 313, the processing element 311 may pull information 318 to gaining visibility to all service-oriented traffic within the network (i.e., passing through the switch). On the other hand, if a specified message type notification is not detected by the message classification service 314, then the corresponding packet is dropped.

Figure 4:
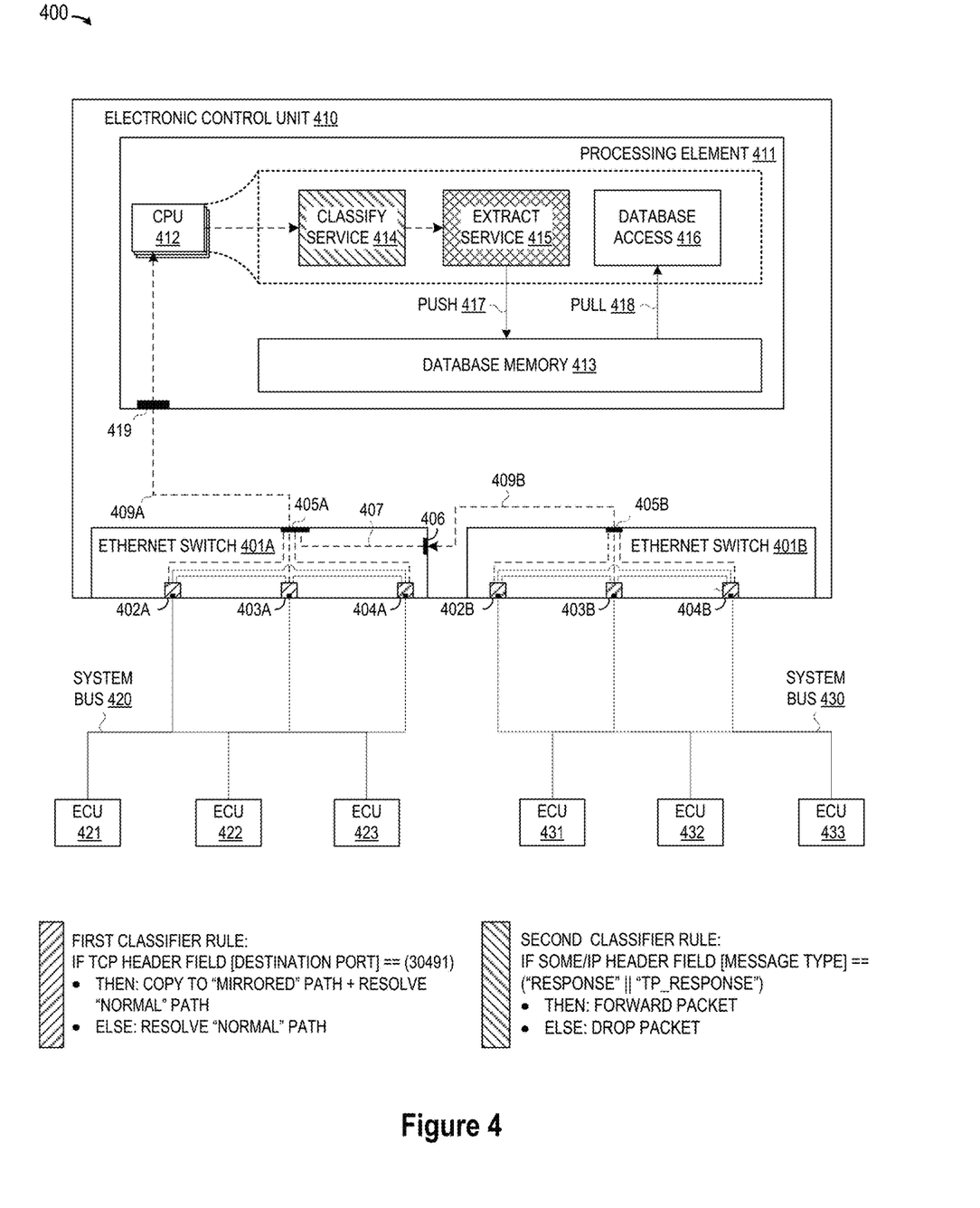
FIG. 4 is a block diagram illustration of an electronic control unit having a processing element and multiple cascaded Ethernet switches connected to provide a centralized data collection system for tracking service-oriented traffic in a distributed service-oriented system in accordance with selected embodiments of the present disclosure.

To provide another example switching configuration for the centralized data collection system of the present disclosure, reference is now made to FIG. 4 which is a simplified block diagram illustration of a networked computer system 400 wherein a single control ECU 410 includes a processing element 411 and multiple cascaded Ethernet switches 401A, 401B connected over separate network system busses 420, 430 to separate groups of ECUs 421-423, 431-433 that define separate networks within the automotive vehicle. In this arrangement, the single control ECU 410 is connected to implement the centralized data collection system by using the first Ethernet switch 401A as a parent or master switch which is connected over a first internal bus conductor 409A to the processing element 411, and by using the second Ethernet switch 401B as a cascaded child or slave switch which is connected over a second internal bus conductor 409B to a dedicated data connection port 406 at the first Ethernet switch 401A.

In this switching configuration, the first (master) Ethernet switch 401A is connected to apply a first classifier rule at each Ethernet port 402A-404A so that any received SOME/IP messages from ECUs 421-423 that are identified as service-oriented traffic are resolved over the normal path to the intended destination and are also mirrored to the processing element 411 over the mirrored traffic path via applicable switch signal path in the first switch 401A, data connection port 405A, first internal bus conductor 409A, and data connection port 419A, much in the same way as depicted in FIG. 1. But instead of being directly connected to the single control ECU 410, the second Ethernet switch 401B is directly connected to the dedicated data connection port 406 of the first Ethernet switch 401A, and applies the first classifier rule at each Ethernet port 402B-404B so that any received SOME/IP messages from ECUs 431-433 identified as service-oriented traffic are resolved over the normal path and are also mirrored to the first Ethernet switch 401A over the mirrored traffic path via the applicable switch signal path in the second switch 401B, data connection port 405B, second internal bus conductor 409B, and data connection port 406. At the first Ethernet switch 401A, any mirrored traffic received from the second Ethernet switch 401B at the data connection port 406 is routed to the processing element 411 over the switch signal path 407, data connection port 405A, first internal bus conductor 409A, and data connection port 419A. And at each of the switches 401A, 401B, if the received SOME/IP network traffic message is not directed to the specified destination port, there is no service-oriented traffic, so the received SOME/IP network traffic message is only sent over the "normal" path to the intended destination ECU without being mirrored to the processing element 411.

At the processing element 411, any mirrored service-oriented traffic message received from either switch 401A, 401B over the data connection port 419 is evaluated to identify specified "publish information" events and to extract specified message data for storage in a centralized database 413. To this end, the processing element 411 includes one or more CPUs 312 and an internal or database memory 413 which are connected and configured to execute a classify service 414 which applies a second classifier rule to identify "publish information" events (i.e., notifications of changes to service information) and to extract specified data from the publish information events for storage in a database memory 413, much in the same way as depicted in FIG. 1. In FIG. 4, the application of the second classification rule at the processing element 411 is indicated with the second cross-hatched shading at the classify service module 414. In an example implementation using the SOME/IP protocol, the second classifier rule applied at the processing element 411 may evaluate a SOME/IP header field from a received SOME/IP network traffic message to determine if the message is directed to a specified message type (e.g., [Message Type]==("RESPONSE"∥"TP_RESPONSE")). If the message classification service 414 detects a specified message type notification that service information is changing, then the processing element 411 forwards the corresponding packet(s) to the extraction service 415 for additional processing to extract specified data from predetermined SOME/IP fields (such as service information or Message ID, Length, and Payload) and to push this data 417 to the database memory 413 for storage. In this way, the ECU 410 builds a central database 413 of service information which is being updated as services are publishing new information on the network 400. Using the database access module 416 to access information in the database 413, the processing element 411 may pull information 418 to gaining visibility to all service-oriented traffic within the network (i.e., passing through the switch). On the other hand, if a specified message type notification is not detected by the message classification service 414, then the corresponding packet is dropped.

Figure 5:
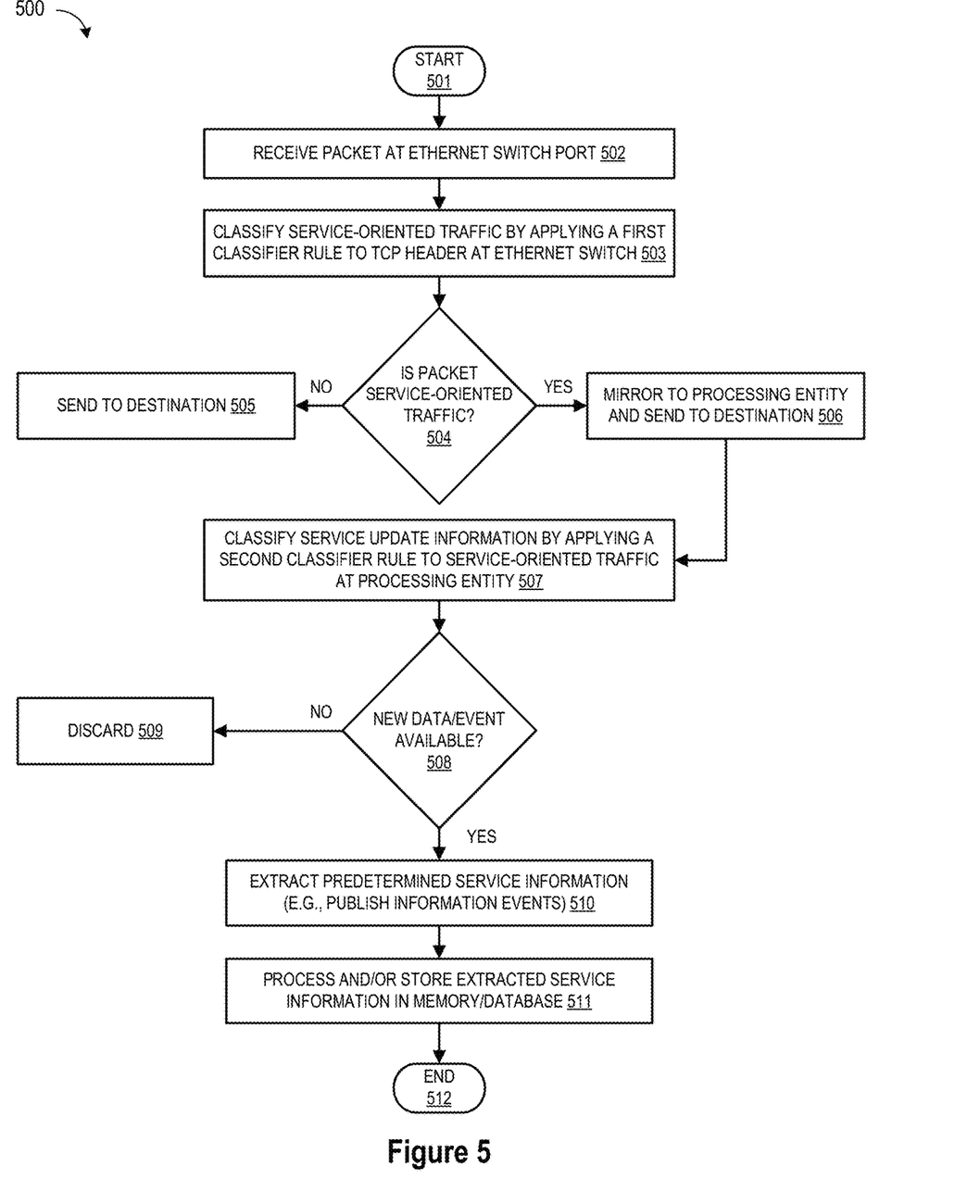
FIG. 5 is a simplified flow chart showing the logic for classifying predetermined message types at an Ethernet switch for mirroring to a processing entity to provide a centralized data collection system for tracking service-oriented traffic in a distributed service-oriented system in accordance with selected embodiments of the present disclosure.

To provide additional details for an improved understanding of selected embodiments of the present disclosure, reference is now made to FIG. 5 which is a simplified flow chart 500 showing the logic for classifying predetermined message types at an Ethernet switch for mirroring to a processing entity to provide a centralized data collection method for tracking service-oriented traffic in a distributed service-oriented system. In the depicted example embodiments, the control logic and methodology shown in FIG. 5 may be implemented as a networked automotive microcontroller device, such as an electronic control unit (ECU), microcontroller (MCU), System-on-a-Chip (SoC), and System-in-a-Package (SiP), with a combination of hardware and software which snoops distributed service-oriented traffic from the network in real-time in a non-intrusive manner to build a central database of service information that is updated as services publish new information on the network. Selected embodiments may be implemented with the specified sequence of classification and extraction operations that are performed by a processor core and/or Ethernet switch of the networked automotive controller device.

In FIG. 5, the method starts during startup or operation of the automotive controller device (step 501) which is connected over a network (e.g., a wired Ethernet network) to a plurality of networked system components. Depending upon the network configuration of the networked system components, the automotive controller device may use any suitable combination of one or more Ethernet switches and processing entities, with the one or more switches being connected to snoop all traffic on the network from the networked system components At step 502, a message packet is received at an Ethernet switch port of the automotive controller device. As disclosed herein, the message packet may be formatted in accordance with a communication protocol that is suitable for providing distributed service-oriented communications over the network, such as the SOME/IP or DDS protocol. For example, in accordance with the SOME/IP protocol, a received message packet includes header and payload portions, with the header including specified message type formatting information which defines how SOME/IP traffic is sent over the network.

At step 503, the received message packet is evaluated to identify service-oriented Ethernet traffic, such as by applying a first classifier rule at the Ethernet switch which classifies the TCP header of the message packet. As disclosed herein, the first classifier rule may use an existing feature of the communication protocol for the message packet to classify the message packet as service-oriented traffic. For example, the SOME/IP protocol specifies that TCP port 30491 may be used as the SOME/IP dynamic port, in which case the first classifier rule is applied to the TCP header field for a match.

At step 504, the determination is made on whether the received message packet is a service-oriented packet. For example, if the application of the first classifier rule determines that the TCP header field is directed to a specified TCP port value (e.g., [Destination Port]==930491), this indicates that the message packet is service-oriented Ethernet traffic (affirmative outcome to step 504), and the message packet is mirrored or forwarded to a processing entity in the automotive controller device and also sent to the intended destination using the normal path (step 506). However, if the application of the first classifier rule determines that the TCP header field is not directed to the specified TCP port value, this indicates that the message packet is not service-oriented Ethernet traffic (negative outcome to step 504), in which case the message packet is sent to the intended destination using the normal path (step 505), but is not mirrored or forwarded to a processing entity.

At step 507, the mirrored message packet is evaluated at the processing entity (or alternatively, the Ethernet switch) to identify service update information, such as by applying a second classifier rule to the service-oriented Ethernet traffic which classifies the Message Type header field of the SOME/IP message header. As disclosed herein, the second classifier rule may use an existing feature of the communication protocol for the message packet to classify the message packet as service update information. For example, the SOME/IP protocol specifies certain Message Types (e.g., RESPONSE or TP_RESPONSE) that may be used to identify service update messages, in which case the second classifier rule is applied to the Message Type header fields for a match.

At step 508, the determination is made on whether there is new data or event information available from the received packet. For example, the application of the second classifier rule may determine whether the received message packet contains service update or response information from the Message Type field. If service update or response information is not included in the mirrored message packet (negative outcome to step 508), then the processing entity discards the mirrored message packet (step 509). However, if the application of the second classifier rule determines from the Message Type field that service update or response information is included in the mirrored message packet (affirmative outcome to step 508, additional processing is applied to extract predetermined service information from the mirrored message packet (step 510). For example, the extraction processing at step 51 may extract "publish information" events, including but not limited to the Message ID, Length, and Payload fields from the SOME/IP message packet.

At step 511, the extracted service information may be processed and/or stored in the memory database. Example processing that may be applied at step 511 may include applying one or more additional classification steps to include specific service IDs for purposes of reducing the amount of captured traffic. In addition or in the alternative, the additional processing may include testing the validity of the captured information, applying timestamp information, and/or detecting whether there has been any change in the payload data. In addition, the storage processing at step 511 may include generating a storage index from the Message ID for use in storing captured information in the memory database.

At step 512, the centralized data collection method ends or returns to the starting step 501.

By now it should be appreciated that there has been provided an apparatus, method, program code, and system for centralized data collection at a single controller device in a distributed service-oriented system of networked devices which provide services over a network system bus which connects the networked devices. In selected embodiments, the single controller device and distributed service-oriented system of networked devices are connected over the network system bus in a star topology to form an automotive vehicle network. In the disclosed method, a message traffic packet formatted with a distributed service-oriented communications protocol is received at an Ethernet switch of the single controller device. In selected embodiments, the distributed service-oriented communications protocol is a Scalable service Oriented MiddlewarE over IP (SOME/IP) communications protocol. At the Ethernet switch of the single controller device, one or more classifiers are applied to the message traffic packet to selectively identify service update information from service-oriented traffic messages in the message traffic packet without generating additional message traffic packets on the network system bus. In selected embodiments, the classifiers are applied by applying a first classifier rule to the message traffic packet at the Ethernet switch of the single controller device to selectively identify any service-oriented traffic message in the message traffic packet without generating additional message traffic packets on the network system bus, and then applying a second classifier rule to each service-oriented traffic message at the processing element of the single controller device to selectively identify service update information from the service-oriented traffic messages without generating additional message traffic packets on the network system bus. In other embodiments, the classifiers are applied by applying a first classifier rule to the message traffic packet at the Ethernet switch of the single controller device to selectively identify any service-oriented traffic message in the message traffic packet without generating additional message traffic packets on the network system bus, and then applying a second classifier rule to each service-oriented traffic message at the Ethernet switch of the single controller device to selectively identify service update information from the service-oriented traffic messages without generating additional message traffic packets on the network system bus. In selected embodiments, applying the first classifier rule determines if the message traffic packet is directed to a TCP destination port that is designated as a dynamic client port at the Ethernet switch under the SOME/IP communications protocol. In addition or in the alternative, applying the second classifier rule determines if a message type header field in any service-oriented traffic message contains one or more values corresponding to publish information events under the SOME/IP communications protocol. In addition, each message traffic packet containing service update information is mirrored to a processing element in the single controller to identify and extract specified data from the identified service update information for storage in a centralized database which is updated as services publish new information on the network system bus. In selected embodiments, the processing elements extracts specified data by extracting message ID, length, and payload data from the identified service update information.

In another form, there is provided an apparatus, method, program code, and system for centralizing data collection in a distributed service-oriented system of networked devices which provide services over a network system bus which connects the networked devices. As disclosed, the integrated circuit includes an Ethernet switch and a processing element. The disclosed Ethernet switch is connected to the network system bus to receive message traffic packets formatted with a distributed service-oriented communications protocol. In particular, the Ethernet switch includes one or more Ethernet ports connected to the network system bus to receive message traffic packets. In addition, the Ethernet switch includes one or more classifiers connected to be applied to received message traffic packets to selectively identify service update information from service-oriented traffic messages in received message traffic packets. The Ethernet switch also includes a data connection port connected to mirror each message traffic packet containing service update information without generating additional message traffic packets on the network system bus. The disclosed processing element is connected to the data connection port of the Ethernet switch to receive each mirrored message traffic packet containing service update information. In operation, the processing element identifies and extracts specified data from the identified service update information for storage in a centralized database which is updated as services publish new information on the network system bus. In selected embodiments, the Ethernet switch applies a first classifier rule to each message traffic packet received at the one or more Ethernet ports to selectively identify any service-oriented traffic message in the message traffic packet without generating additional message traffic packets on the network system bus, and the processing element applies a second classifier rule to each service-oriented traffic message to selectively identify service update information from the service-oriented traffic messages without generating additional message traffic packets on the network system bus. In other embodiments, the Ethernet switch applies a first classifier rule to each message traffic packet received at the one or more Ethernet ports to selectively identify any service-oriented traffic message in the message traffic packet without generating additional message traffic packets on the network system bus, and also applies a second classifier rule to each service-oriented traffic message to selectively identify service update information from the service-oriented traffic messages without generating additional message traffic packets on the network system bus. As disclosed, the distributed service-oriented communications protocol may be a Scalable service Oriented MiddlewarE over IP (SOME/IP) communications protocol, a data distribution service (DDS), or any suitable distributed service-oriented communications protocol. In the SOME/IP communications protocol embodiment, the one or more classifiers in the Ethernet switch may apply a first classifier rule to determine if the message traffic packet is directed to a TCP destination port that is designated as a dynamic client port at the Ethernet switch under the SOME/IP communications protocol. In addition, the processing element may apply a second classifier rule to determine if a message type header field in any service-oriented traffic message contains one or more values corresponding to publish information events under the SOME/IP communications protocol. In addition, the processing element may extract message ID, length, and payload data from the identified service update information. In selected embodiments, the integrated circuit may be embodied with a single electronic control unit connected to a distributed service-oriented system of networked devices over the network system bus in a star topology to form an automotive vehicle network.

In yet another form, there is provided a distributed service-oriented automotive system, method, apparatus, and program control code for use with multiple networked devices connected over a network system bus. The disclosed distributed service-oriented automotive system includes an electronic control unit connected to the network system bus for centralizing data collection in the distributed service-oriented automotive system by monitoring message traffic packets which are formatted with a distributed service-oriented communications protocol and sent over the network system bus. In particular, the electronic control unit includes a first Ethernet switch and a processing element. The first Ethernet switch is connected to the network system bus to snoop message traffic packets formatted with a distributed service-oriented communications protocol. To this end, the first Ethernet switch includes one or more Ethernet ports connected to the network system bus to receive message traffic packets. The first Ethernet switch also includes one or more classifiers connected to be applied to received message traffic packets to selectively identify service update information from service-oriented traffic messages in received message traffic packets. In addition, the first Ethernet switch includes a data connection port connected to mirror each message traffic packet containing service update information without generating additional message traffic packets on the network system bus. The disclosed processing element is connected to the data connection port of the first Ethernet switch to receive each mirrored message traffic packet containing service update information and to identify and extract specified data from the identified service update information for storage in a centralized database which is updated as services publish new information on the network system bus. In selected embodiments, the first Ethernet switch applies a first classifier rule to each message traffic packet received at the one or more Ethernet ports to selectively identify any service-oriented traffic message in the message traffic packet without generating additional message traffic packets on the network system bus, and the processing element applies a second classifier rule to each service-oriented traffic message to selectively identify service update information from the service-oriented traffic messages without generating additional message traffic packets on the network system bus. In other embodiments, the processing element may apply a third classifier rule to each service-oriented traffic message to selectively classify on specified service IDs to further reduce traffic that is captured by the processing element. In yet other embodiments, the distributed service-oriented automotive system may also include a second Ethernet switch connected as a cascaded switch with the first Ethernet switch such that the second Ethernet switch is also connected to the network system bus to snoop message traffic packets formatted with a distributed service-oriented communications protocol. In such embodiments, the second Ethernet switch may include one or more second Ethernet ports connected to the network system bus to receive message traffic packets, one or more second classifiers connected to be applied to received message traffic packets to selectively identify service update information from service-oriented traffic messages in received message traffic packets, and a second data connection port connected to send each message traffic packet containing service update information as a mirrored message to the first Ethernet switch or to the processing element without generating additional message traffic packets on the network system bus.

Although the described exemplary embodiments disclosed herein are directed to centralized data collection methods and systems which may be applied to non-intrusively snoop network messages for service traffic, such as may be used with the SOME/IP message protocol, the present invention is not necessarily limited to the example embodiments illustrate herein, and various embodiments of the circuitry and methods disclosed herein may be implemented with other devices and circuit components. For example, various embodiments may use the techniques for collecting service update information from network packets using other communication protocols to reduce network load and improve visibility of all service information in the networked system. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for centralized data collection at a single controller device in a distributed service-oriented system of networked devices which provide services over a network system bus which connects the networked devices, comprising:

receiving a message traffic packet at an Ethernet switch of the single controller device, where the message traffic packet is formatted with a distributed service-oriented communications protocol;

applying one or more classifiers to the message traffic packet at the Ethernet switch of the single controller device to selectively identify service update information from service-oriented traffic messages in the message traffic packet without generating additional message traffic packets on the network system bus; and     mirroring each message traffic packet containing service update information to a processing element in the single controller to identify and extract specified data from the identified service update information for storage in a centralized database which is updated as services publish new information on the network system bus,     wherein applying one or more classifiers comprises:

applying a first classifier rule to the message traffic packet at the Ethernet switch of the single controller device to selectively identify any service-oriented traffic message in the message traffic packet without generating additional message traffic packets on the network system bus; and         one of:

applying a second classifier rule to each service-oriented traffic message at the processing element of the single controller device to selectively identify service update information from the service-oriented traffic messages without generating additional message traffic packets on the network system bus, or             applying a second classifier rule to each service-oriented traffic message at the Ethernet switch of the single controller device to selectively identify service update information from the service-oriented traffic messages without generating additional message traffic packets on the network system bus.

2. The method of claim 1, wherein applying one or more classifiers comprises:

applying the second classifier rule to each service-oriented traffic message at the processing element of the single controller device to selectively identify service update information from the service-oriented traffic messages without generating additional message traffic packets on the network system bus.

3. The method of claim 1, wherein applying one or more classifiers comprises:

applying the second classifier rule to each service-oriented traffic message at the Ethernet switch of the single controller device to selectively identify service update information from the service-oriented traffic messages without generating additional message traffic packets on the network system bus.

4. A method for centralized data collection at a single controller device in a distributed service-oriented system of networked devices which provide services over a network system bus which connects the networked devices, comprising:

receiving a message traffic packet at an Ethernet switch of the single controller device, where the message traffic packet is formatted with a distributed service-oriented communications protocol;

applying one or more classifiers to the message traffic packet at the Ethernet switch of the single controller device to selectively identify service update information from service-oriented traffic messages in the message traffic packet without generating additional message traffic packets on the network system bus; and     mirroring each message traffic packet containing service update information to a processing element in the single controller to identify and extract specified data from the identified service update information for storage in a centralized database which is updated as services publish new information on the network system bus,     wherein the distributed service-oriented communications protocol is a Scalable service Oriented MiddlewarE over IP (SOME/IP) communications protocol, and     wherein applying one or more classifiers comprises applying a first classifier rule to determine if the message traffic packet is directed to a TCP destination port that is designated as a dynamic client port at the Ethernet switch under the SOME/IP communications protocol.

5. The method of claim 4, wherein applying one or more classifiers comprises applying a second classifier rule to determine if a message type header field in any service-oriented traffic message contains one or more values corresponding to publish information events under the SOME/IP communications protocol.

6. The method of claim 5, further comprising extracting message ID, length, and payload data from the identified service update information.

7. The method of claim 1, wherein the single controller device and distributed service-oriented system of networked devices are connected over the network system bus in a star topology to form an automotive vehicle network.

8. An integrated circuit for centralizing data collection in a distributed service-oriented system of networked devices which provide services over a network system bus which connects the networked devices, comprising:

an Ethernet switch connected to the network system bus to receive message traffic packets formatted with a distributed service-oriented communications protocol, where the Ethernet switch comprises:

one or more Ethernet ports connected to the network system bus to receive message traffic packets,         one or more classifiers connected to be applied to received message traffic packets to selectively identify service update information from service-oriented traffic messages in received message traffic packets, and         a data connection port connected to mirror each message traffic packet containing service update information without generating additional message traffic packets on the network system bus; and     a processing element connected to the data connection port of the Ethernet switch to receive each mirrored message traffic packet containing service update information and to identify and extract specified data from the identified service update information for storage in a centralized database which is updated as services publish new information on the network system bus,     wherein the Ethernet switch applies a first classifier rule to each message traffic packet received at the one or more Ethernet ports to selectively identify any service-oriented traffic message in the message traffic packet without generating additional message traffic packets on the network system bus, and where the processing element or the Ethernet switch applies a second classifier rule to each service-oriented traffic message to selectively identify service update information from the service-oriented traffic messages without generating additional message traffic packets on the network system bus.

9. The integrated circuit of claim 8, where the processing element applies the second classifier rule to each service-oriented traffic message to selectively identify service update information from the service-oriented traffic messages without generating additional message traffic packets on the network system bus.

10. The integrated circuit of claim 8, where the Ethernet switch applies the second classifier rule to each service-oriented traffic message to selectively identify service update information from the service-oriented traffic messages without generating additional message traffic packets on the network system bus.

11. An integrated circuit for centralizing data collection in a distributed service-oriented system of networked devices which provide services over a network system bus which connects the networked devices, comprising:
an Ethernet switch connected to the network system bus to receive message traffic packets formatted with a distributed service-oriented communications protocol, where the Ethernet switch comprises:
one or more Ethernet ports connected to the network system bus to receive message traffic packets,
one or more classifiers connected to be applied to received message traffic packets to selectively identify service update information from service-oriented traffic messages in received message traffic packets, and
a data connection port connected to mirror each message traffic packet containing service update information without generating additional message traffic packets on the network system bus; and
a processing element connected to the data connection port of the Ethernet switch to receive each mirrored message traffic packet containing service update information and to identify and extract specified data from the identified service update information for storage in a centralized database which is updated as services publish new information on the network system bus,
wherein the distributed service-oriented communications protocol is a Scalable service Oriented MiddlewarE over IP (SOME/IP) communications protocol, and
wherein the one or more classifiers in the Ethernet switch apply a first classifier rule to determine if the message traffic packet is directed to a TCP destination port that is designated as a dynamic client port at the Ethernet switch under the SOME/IP communications protocol.

12. The integrated circuit of claim 11, wherein the one or more classifiers in the Ethernet switch apply a first classifier rule to determine if the message traffic packet is directed to a TCP destination port that is designated as a dynamic client port at the Ethernet switch under the SOME/IP communications protocol.

13. The integrated circuit of claim 12, wherein the processing element applies a second classifier rule to determine if a message type header field in any service-oriented traffic message contains one or more values corresponding to publish information events under the SOME/IP communications protocol.

14. The integrated circuit of claim 13, wherein the processing element extracts message ID, length, and payload data from the identified service update information.

15. The integrated circuit of claim 8, wherein the integrated circuit comprises a single electronic control unit connected to a distributed service-oriented system of networked devices over the network system bus in a star topology to form an automotive vehicle network.

16. A distributed service-oriented automotive system of multiple networked devices connected over a network system bus, comprising:
an electronic control unit connected to the network system bus for centralizing data collection in the distributed service-oriented automotive system by monitoring message traffic packets which are formatted with a distributed service-oriented communications protocol and sent over the network system bus, the electronic control unit comprising:
a first Ethernet switch connected to the network system bus to snoop message traffic packets formatted with a distributed service-oriented communications protocol, where the first Ethernet switch comprises:
one or more Ethernet ports connected to the network system bus to receive message traffic packets,
one or more classifiers connected to be applied to received message traffic packets to selectively identify service update information from service-oriented traffic messages in received message traffic packets, and
a data connection port connected to mirror each message traffic packet containing service update information without generating additional message traffic packets on the network system bus;
a processing element connected to the data connection port of the first Ethernet switch to receive each mirrored message traffic packet containing service update information and to identify and extract specified data from the identified service update information for storage in a centralized database which is updated as services publish new information on the network system bus; and
a second Ethernet switch connected as a cascaded switch with the first Ethernet switch, where the second Ethernet switch is connected to the network system bus to snoop message traffic packets formatted with a distributed service-oriented communications protocol, where the second Ethernet switch comprises:
one or more second Ethernet ports connected to the network system bus to receive message traffic packets,
one or more second classifiers connected to be applied to received message traffic packets to selectively identify service update information from service-oriented traffic messages in received message traffic packets, and
a second data connection port connected to send each message traffic packet containing service update information as a mirrored message to the first Ethernet switch or to the processing element without generating additional message traffic packets on the network system bus.

17. The distributed service-oriented automotive system of claim 16, where the first Ethernet switch applies a first classifier rule to each message traffic packet received at the one or more Ethernet ports to selectively identify any service-oriented traffic message in the message traffic packet without generating additional message traffic packets on the network system bus, and where the processing element applies a second classifier rule to each service-oriented traffic message to selectively identify service update information from the service-oriented traffic messages without generating additional message traffic packets on the network system bus.

18. The distributed service-oriented automotive system of claim 17, where the processing element applies a third classifier rule to each service-oriented traffic message to selectively classify on specified service IDs to further reduce traffic that is captured by the processing element.

* * * * *